United States Patent
Hong et al.

(10) Patent No.: US 11,101,690 B2
(45) Date of Patent: Aug. 24, 2021

(54) DISTRIBUTED ENERGY RESOURCE REGISTRATION

(71) Applicant: ABB Schweiz AG, Baden (CH)

(72) Inventors: Junho Hong, Cary, NC (US); Zhenyuan Wang, Apex, NC (US)

(73) Assignee: ABB Schweiz AG, Baden (CH)

( * ) Notice: Subject to any disclaimer, the term of this patent is extended or adjusted under 35 U.S.C. 154(b) by 285 days.

(21) Appl. No.: 16/427,739

(22) Filed: May 31, 2019

(65) Prior Publication Data
US 2020/0381940 A1    Dec. 3, 2020

(51) Int. Cl.
*H02J 13/00* (2006.01)
*G05B 19/042* (2006.01)
*H04L 29/08* (2006.01)
*H02J 3/38* (2006.01)

(52) U.S. Cl.
CPC ........ *H02J 13/0017* (2013.01); *G05B 19/042* (2013.01); *H02J 13/00006* (2020.01); *H04L 67/12* (2013.01); *G05B 2219/2639* (2013.01); *H02J 3/381* (2013.01); *Y02E 60/00* (2013.01)

(58) Field of Classification Search
CPC .. H02J 13/0017; H02J 3/381; H02J 13/00006; G05B 19/042; H04L 67/12
USPC ........................................................ 700/286
See application file for complete search history.

(56) References Cited

U.S. PATENT DOCUMENTS

| 8,401,709 | B2 | 3/2013 | Cherian et al. |
| 8,583,520 | B1 | 11/2013 | Forbes, Jr. |
| 2013/0054036 | A1* | 2/2013 | Cherian ................. H02J 3/008 700/286 |
| 2018/0246536 | A1* | 8/2018 | Forbes, Jr. ........ H02J 13/00001 |

FOREIGN PATENT DOCUMENTS

WO    2019075318 A1    4/2019

OTHER PUBLICATIONS

W. Deng et al., "Adaptive Microgrid Operation Based on IEC 61850," Energies; dated May 18, 2015, pp. 4455-4475, vol. 8; No. 5, MDPI, Basel, Switzerland.
(Continued)

*Primary Examiner* — Mohammad Ali
*Assistant Examiner* — Joshua T Sanders
(74) *Attorney, Agent, or Firm* — Slater Matsil, LLP

(57) ABSTRACT

Systems, methods, techniques and apparatuses of DER registration and de-registration are disclosed. One exemplary embodiment is a power distribution system including a distributed energy resource (DER), a DER controller, and a central controller. The DER interface controller includes a DER controller interface configured to communicate with the DER controller using a DER controller native format, an external device interface configured to communicate with the central controller using one of a plurality of communication protocols, a registration circuitry configured to transmit a registration request to the central controller, and a mapping circuitry. The central controller is configured to receive the registration request, and update a DER registry in response receiving the registration request. The mapping circuitry is configured to receive input defining power distribution characteristics in response to the central controller updating the DER registry.

20 Claims, 3 Drawing Sheets

(56) References Cited

OTHER PUBLICATIONS

C. Brunner et al., "Deliverable 2.2—Generic interface specification for DER components and registry," OS4ES, dated Aug. 28, 2015, 37 pp., European Commission, available at http://os4es.eu/Downloads/, last accessed Jan. 29, 2019.

C. Van Der Broek et al., "Deliverable 4.3—Distributed DER Registry prototype with test results," OS4ES, dated Sep. 23, 2016; 29 pp., European Commission, available at http://os4es.eu/Downloads/, last accessed Jan. 29, 2019.

\* cited by examiner

DISTRIBUTED ENERGY RESOURCE REGISTRATION

BACKGROUND

The present disclosure relates to distributed energy resources (DERs) registration and de-registration. DERs, such as solar, wind and combustion engine power generation systems are increasingly being introduced into electrical power grids. Coordinating control of DERs in a power system allows the power system to use DERs to regulate frequency and perform other power system functions. Due to the large number of types of DERs, there are a similarly large number of ways to communicate with DERs in a power system. Some efforts have been made to address these challenges such as the introduction and use of standard-based communication protocols. Yet, many DERs are not compatible with standard-based communication protocols and may also not be compatible communication protocols used by other power system devices. As DERs continue to be added to the power systems, control and communication in such environments is becoming increasingly complex. There remain unmet needs including reducing DER registration and de-registration complexity, simplifying data transfer in existing power systems, and increasing power system responsiveness to faults and other grid conditions. For instance, many DERs cannot be registered with a power system without manual registration initiated by a customer. Furthermore, de-registration of a DER in order to complete regular maintenance or transfer ownership also requires manual adjustments by a system operator or customer. DERs not capable of communicating using standard based communication protocols require time-consuming configuration in order to communicate with other devices in a power system. Using multiple communication protocols to communicate within a single power system slows or prohibits data exchange and power system responsiveness to faults and other conditions within the power system. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for distributed energy resource registration. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
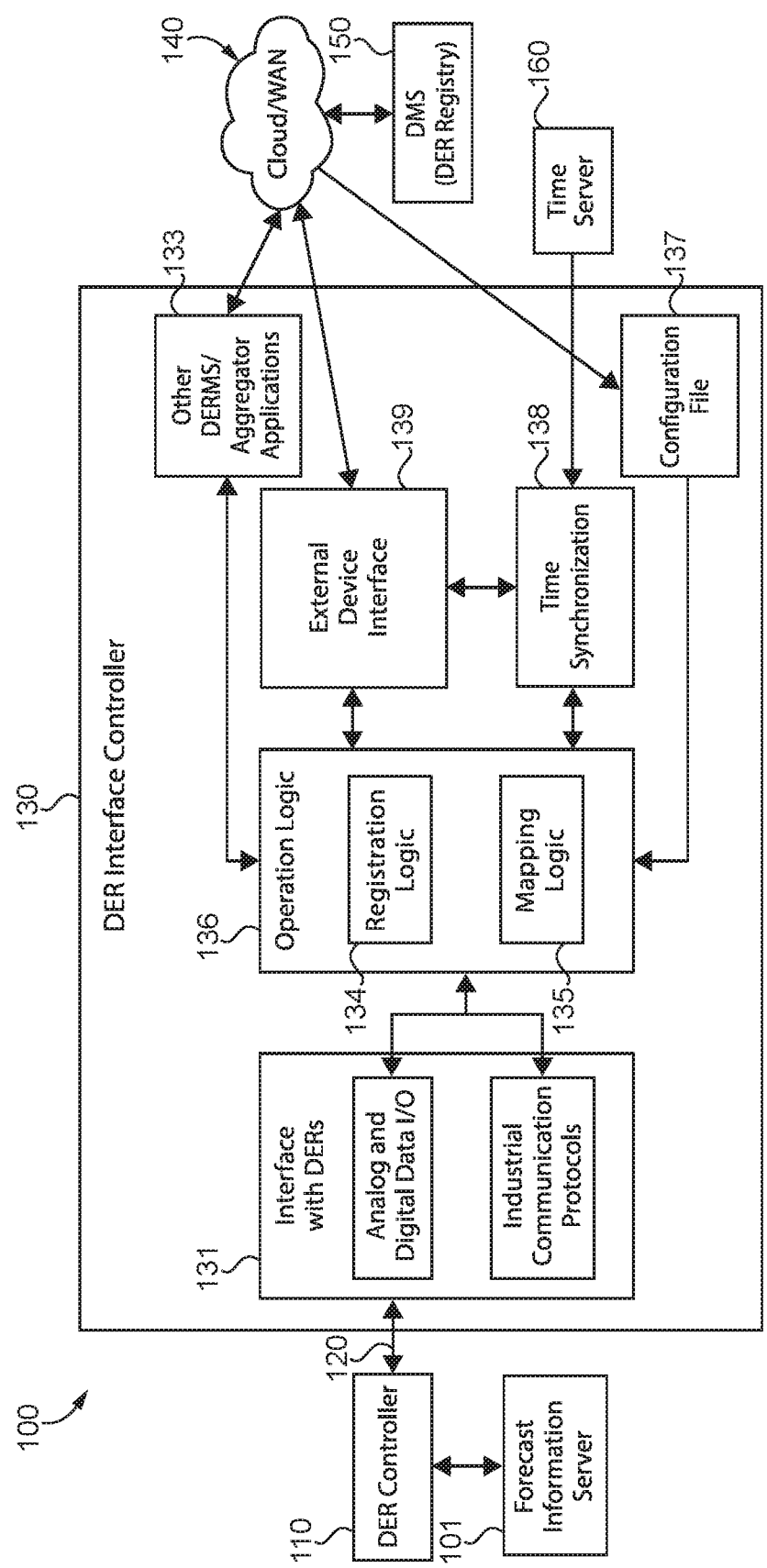
FIG. 1 is a schematic block diagram illustrating an exemplary power distribution control system.

With reference to FIG. 1 there is illustrated an exemplary power distribution control system 100 including a distributed energy resource (DER) controller 110, a DER interface controller 130, and a central controller 150. Control system 100 is configured to detect, register, and de-register a DER controlled by DER controller 110, automatically identify DER characteristics, transfer DER ownership to other systems, update a power system model, and adjust power system operation strategies in response to forecast information and registration or de-registration activities.

It shall be appreciated that the DER interface controller 130 may be in communication with a variety of power system device controllers in a power distribution system, including controllers for automatic switches, relays, power converters, or multiple DER controllers, to name but a few examples. As further described herein, DER interface controller 130 is one example of an exemplary controller that extends the operability of a DER in that the DER is able to self-register and de-register with a central controller without user action despite the DER controller communicating using a format incompatible with the central controller.

DER controller 110 is structured to monitor and/or operate a DER that controllably provides power to a power distribution system. The DER may include a combined heat and power plant, a photovoltaic (PV) array, a wind turbine, an electric vehicle, a battery energy storage system, a flywheel, a diesel generator, a home energy management system, or a building energy management system, to name but a few examples. The DER may include a controllable device operated by DER controller 110, such as an inverter or a DC-DC optimizer, to name but a few examples. Controller 110 may also be coupled to sensors or other types of devices structured to monitor the DER, such as measuring electrical or physical characteristics of the DER. For example, controller 110 may receive measurements from voltage sensors or current sensors, as well as a switch status, from an intelligent electronic device.

Controller 110 may be structured to store data including operational data and registration data. Operational data corresponds to electrical or physical characteristics, measured or observed, related to the DER. Registration data may include the serial number of the DER, to name but one example.

Controller 110 includes a communication port structured to transmit and receive data or commands. The data transmitted between controller 110 and DER interface controller 130 may include operational data or registration data, to name but a few examples. In certain embodiments, controller 110 may transmit forecasted power output data from a server 101 to DER interface controller 130.

DER controller 110 is structured to transmit data to DER interface controller 130 using a communication channel 120. In certain embodiments, communication channel 120 is bidirectional, allowing DER controller 110 to receive commands or data from another device. Communication channel 120 may be wired or wireless. DER controller 110 may include one communication port or a plurality of communication ports to which communication channel 120 may be operatively coupled. For example, DER controller 110 may include a 16 pin serial port, a 32 pin serial port, or an Ethernet port, to name but a few examples.

Data exchanged between DER controller 110 and DER interface controller 130 is transmitted using a DER controller native format. In certain embodiments, the DER controller native format includes an analog and digital type of input/output circuitry. For example, controller 110 may be structured to send measurements via an analog port and a switch status via a digital port. In certain embodiments, the DER controller native format includes industrial communications circuitry structured to map data to an industrial communications protocol before communicating with DER interface controller 130. Industrial communication protocols may include Modbus, Distributed Network Protocol (DNP3), Fieldbus, or other vendor-defined communication protocols, to name but a few examples.

DER interface controller 130 is structured to receive data from DER controller 110 by way of communication channel 120 using the DER controller native format, map the received data to a different communication protocol used by another device in a power distribution system, and output the received data to another device in the power distribution system. In certain embodiments, DER interface controller 130 is structured to receive commands from another device of the power distribution system, map the received commands to the DER controller native format, and output the received commands to DER controller 110. In certain embodiments, DER interface controller 130 is incorporated into a local distributed energy resource management system (DERMS), a local DERMS/aggregator gateway, or a facility/community aggregator gateway, to name but a few examples.

DER interface controller 130 includes a DER controller interface 131 coupled to communication channel 120, an operation circuitry 136, an external device interface 139, and a time synchronization circuitry 138. DER interface controller 130 may also include additional circuitry 133 configured to perform DERMS functions or aggregator applications, to name but a few examples.

Interface 131 may include a plurality of different types of ports such that DER interface controller 130 may communicate with any DER controller. Interface 131 is structured to transfer data between DER controller 110 and interface 131 using any type of DER controller native format, including analog or digital data I/O, industrial communication protocols, or a combination thereof.

Operation circuitry 136 includes registration circuitry 134 and data mapping circuitry 135. Registration circuitry 134 is configured to register and de-register the DER corresponding to DER controller 110. To initially register a newly detected DER, registration circuitry 134 may receive a transmission of registration data from DER controller 110 and output the registration data to an external device interface 139 for transmittal to a DER registry stored on a central controller 150. The transmission of registration data may be initiated manually by a user transmitting registration data to DER interface controller 130 or may be initiated automatically once DER controller 110 connects to DER interface controller 130 via communication channel 120. As explained in more detail below, the DER registry uses the received registration data to gather required data for centrally controlling the DER including identifying information and operating characteristics. For example, the DER registry may gather the DER type, unique identification number, and nameplate information, to name but a few examples. The gathered required data is stored in the DER registry.

It shall be appreciated that the circuitry disclosed herein, including operation circuitry 136, registration circuitry 134 and data mapping circuitry 135 may be provided in a number of forms and combinations. In some embodiments, the circuitry disclosed herein may be provided in whole or in part by one or more microprocessors, microcontrollers, other integrated circuits, or combinations thereof which are configured to execute instructions stored in a non-transitory memory medium, for example, in the form of stored firmware and/or stored software. It shall be appreciated microprocessor, microcontroller and other integrated circuit implementations of the control circuitry disclosed herein may comprise multiple instances of control circuitry which utilize common physical circuit elements. For example, first control circuitry may be provided by a combination of certain processor circuitry and first memory circuitry, and second control circuitry may be provided by a combination of that certain processor circuitry and second memory circuitry differing from the first memory circuitry. It shall be further appreciated that the disclosed circuitry may additionally or alternatively comprise other digital circuitry, analog circuitry, or hybrid analog-digital circuitry or combinations thereof. Some non-limiting example elements of such circuitry include application specific integrated circuits (ASICs), arithmetic circuitry units (ALUs), amplifiers, analog calculating machine(s), analog to digital (A/D) and digital to analog (D/A) converters, clocks, communication ports, field programmable gate arrays (FPGAs), filters, format converters, modulators or demodulators, multiplexers and de-multiplexers, non-transitory memory devices and media, oscillators, processors, processor cores, signal conditioners, state machine(s), and timers. As with microprocessor, microcontroller and other integrated circuit implementations, such alternate or additional implementations may implement or utilize multiple instances of control circuitry which utilize common physical circuit elements. For example, first control circuitry may be provided by a combination of first control circuitry elements and second control circuitry elements, and second control circuitry may be provided by a combination of the first control circuitry elements and third control circuitry elements differing from the first control circuitry elements.

In response to receiving a request to de-register a DER temporarily or permanently, registration circuitry 134 will initialize a previously mapped data configuration in data mapping circuitry 135 and wait for a new registration request for the DER. Circuitry 134 may also transmit the de-registration request to central controller 150 in order to update the DER registry and power network model.

Data mapping circuitry 135 is configured to receive data from DER controller 110 in the form of the communication protocol used by communication channel 120. Using the received data, data mapping circuitry 135 maps the data to a standard based data structure. Data mapping circuitry 135 may also receive data from another power device and map the received data to the communication protocol used by DER controller 110. The standard data structure may include a plurality of common data types, including boolean, integer (int8, int16, int32, int64, enum), unsigned integer (int8u, int16u, int32u, dbpos, quality), floating point (float32, float64), or raw character byte (visible string, unicoded string, octet string, timestamp). Data received by data mapping circuitry 135 which does not conform to the standard data structure is mapped to the common data types of the standard data structure.

In certain embodiments, the data mapping circuitry 135 is structured to abstract the definition of data items by creating data objects and services independent of communication protocols. The abstracted data models define a standardized data structure for describing a power system that enables all controllers of the power system to exchange data using identical protocols. The abstracted definitions allow mapping of the data objects and services from one communication protocol to another. For example, data mapping circuitry 135 may map data using a data model including a plurality of logical nodes, each logical node being a grouping of data and associated services related to a power function. Within each logical node is one or more data objects conforming to a common data class. Mapping includes transforming the model information into an object defined by a communication protocol. In certain embodiments, data mapping circuitry 135 uses abstraction and mapping techniques compatible with the IEC 61850 standard.

Standard based peer-to-peer communication enables a DER to be automatically registered and de-registered from a central controller without direct user input. Standard based peer-to-peer communication also enables the fast data exchange between DER controllers and central controllers, such as changes to power network models caused by maintenance activities or changes in DER ownership. This enables operators to more reliably schedule network operation knowing which DERs are online and offline.

Using semantics based standard information models reduces registration and de-registration time, simplifying integration of different DER controllers from different vendors, and provides standard means for aggregating power distribution system resource capabilities. Additional grid services may be performed by DER controllers with new communication capabilities of the DER interface controllers, such as ancillary frequency regulation or Volt/VAR control.

DER interface controller 130 includes external device interface 139 structured to communicate with external power devices such as central controller 150 using one of a set of standard communication protocols. DER interface controller 130 is coupled to central controller 150 by way of a communication channel 140. In the illustrated embodiment, communication channel 140 includes a wireless network, such as a third-party cloud system or a wide area network (WAN). In other embodiments, communication channel 140 is a wired connection between controller 130 and controller 150. In certain embodiments, DER interface controller 130 is coupled to a plurality of external devices by way of a plurality of communication channels.

In certain embodiments, the set of standard communication protocols use a standard information model generated using data abstraction and a configuration language. Using the set of standard communication protocols allows for real-time communication with self-description. It is important to note that industrial protocols lack these features. For example, standard communication protocols such as GOOSE and SMV use a layer 2 communication data link which allows for real-time communication, as opposed to DNP3 or Modbus which require TCP/IP.

In certain embodiments, one standard communication protocol is structured to transfer time-stamped state information between data objects of the data model. In certain embodiments, one standard communication protocol is structured to transmit real-time data in an XML format. In certain embodiments, one standard communication protocol is structured to transfer samples of time-stamped sampled measured values.

In the illustrated embodiment, external device interface 139 only communicates with a central controller 150. In other embodiments, interface 139 may communicate with a relay, another DER interface controller, a microgrid controller, or any other power distribution device configured to communicate in a standard communication protocol.

In certain embodiments, interface 139 is structured to communicate with central controller 150 using communication protocols defined by IEC 61850, such as IEC 61850-7-420 and IEC 61850-90-7. These communication protocols include a generic object-oriented substation event (GOOSE), a manufacturing message specification (MMS), sampled measured values (SMV), and Extensible Messaging and Presence Protocol (XMPP). In certain embodiments, interface 139 is structured to communicate with central controller 150 using IEEE 2030.5 communication protocol or OpenFMB, to name but a few examples.

In the illustrated embodiment, DER interface controller 130 includes an additional applications circuitry 133 structured to execute algorithms using data received by DER interface controller 130 from DER controller 110 or central controller 150. For example, circuitry 133 may receive circuit breaker statuses for all breakers within a zone of a microgrid from an Information Communication and Technology network, and determine whether the microgrid is operating in grid-connected mode or islanded mode. In another example, additional applications circuitry 133 may receive multiple sampled measurement value streams from several external devices in a microgrid and determine issues with sensors, detect data spoofing, or detect a cyber-attack. In still another example, circuitry 133 may receive sampled values from an AC grid connection point and calculate both non-directional and directional overcurrent protections for backup protection. Circuitry 133 could also calculate a fault indicator of a microgrid or determine a desired fault ride through characteristics, such as the characteristics defined by IEEE 1547-2017. Analysis generated by circuitry 133 may be available for other devices of the power system. For example, calculated fault indicators may be sent to a microgrid controller for fault-cause determination, fault location and microgrid restoration processes.

DER interface controller 130 includes a time synchronization circuitry 138 structured to communicate with an external timing device 160 by way of a communication channel 170. Circuitry 138 receives time data according to a standard protocol, such as pulse per second (PPS), Simple Network Time Protocol (SNTP), or IEEE 1588, to name but a few examples. Circuitry 138 receives the time data and synchronizes all data in DER interface controller 130. For example, using time data, DER interface controller 130 may determine whether incoming data from central controller 150 is expired. External timing device 160 may be a GPS receiver that supports time protocols such as PPS, SNTP and IEEE 1588, to name but a few examples.

Central controller 150 is structured to store a DER registry which maintains a list of all operational DERs in a power distribution system capable of being monitored or controlled by central controller 150. Central controller 150 also stores a power network model. Registration and de-registration requests received by central controller 150 cause the central controller to update the DER registry and the power network model. DER interface controller 130 includes a configuration file 137 received following the transmittal of the registration request from DER interface controller 130 to central controller 150. In certain embodiments, central controller 150 transmits the configuration file 137 to DER interface controller 130 in response to receiving the registration request from DER interface controller 130. For example, the registration request may include transmitting registration data, such as a serial number, from DER interface controller 130 to central controller 150. Once central controller 150 receives the registration data, central controller 150 will find the necessary information required to complete DER registration. File 137 is then generated by central controller 150 to assemble the mapping information needed by operation circuitry 136 to pass commands and data between DER controller 110 and other controllers of a power distribution system. In certain embodiments, configuration file 137 is received from a third party source, such as a web server by way of communication channel 140.

In certain embodiments, configuration file 137 is a Substation Configuration Description file. Operation circuitry 136 of DER interface controller 130 is configured to parse file 137 and transmit data about the power system in file 137 to data mapping circuitry 135. File 137 may be received by way of a dedicated port or by way of external device interface 139. An SCD file is a computer file in XML format created according to standard based schema. The SCD file may include a single line diagram, as well as communication network and IED information. Operation circuitry 136 parses the SCD file and retrieves information regarding external devices with which to exchange information, including the single line diagram, communication network information, external device information, logical device information, logical node information, data object information, data attribute information, component information, GOOSE control block information, and MMS control block information. Information from the SCD file is allocated to each function of data mapping circuitry 135.

To give one example, operation circuitry 136 retrieves information regarding a GOOSE control block, allocates data in the data mapping circuitry 135, and maps data received from DER controller 110 to a GOOSE communication protocol used by external device interface 139. DER controller 110 may be configured with predefined setting values and functions based on the SCD file.

To give another example, operation circuitry 136 uses the SCD file to determine a circuit breaker status dataset should be received from another power device within the same power distribution system. The SCD file is updated when the power distribution system is restructured or the communication network is altered.

The SCD file may be updated when another DER interface controller of the power distribution system registers or de-registers a DER with the DER registry of central controller 150. In certain embodiments, the communication network model and single line diagram data can be provided in a common information model (CIM) format, IEEE 2030.5 standard, and OpenFMB standard, or other communication models can be configured using configuration file 137.

Figure 2:
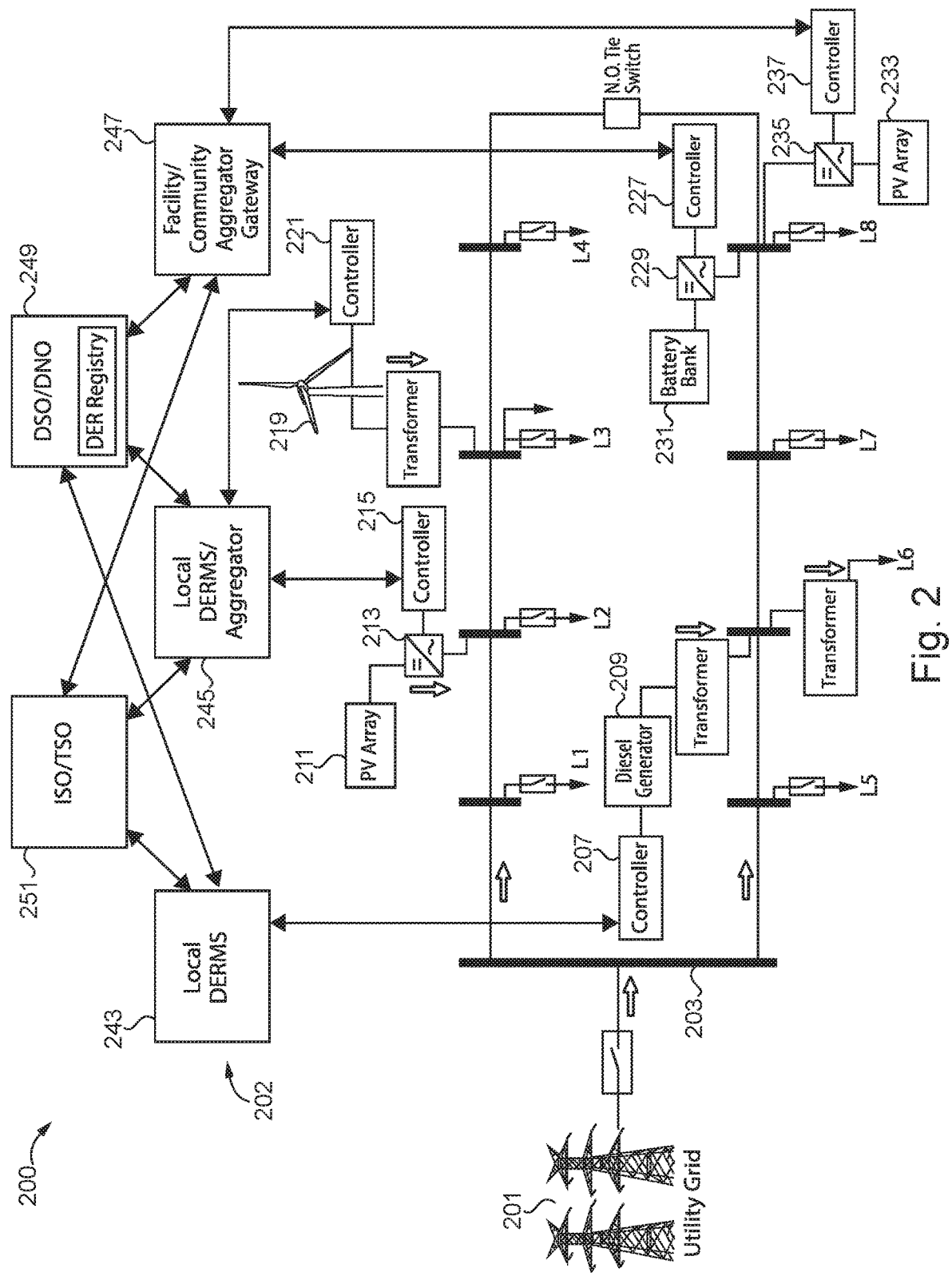
FIG. 2 is a circuit diagram illustrating an exemplary power distribution system.

It shall be appreciated that any or all of the foregoing features of DER interface controller 130 may also be present in the other DER interface controllers disclosed herein, such as the DER interface controllers of system 200 in FIG. 2.

With reference to FIG. 2 there is illustrated an exemplary power distribution system 200 including a control system 202 structured to coordinate DER operation at a centralized controller using automatic DER registration/de-registration and standardized communication protocols. It shall be appreciated that the topology of system 200 is illustrated for the purpose of explanation and is not intended as a limitation of the present disclosure. Although system 200 is illustrated with a single line diagram, system 200 may be structured to transmit single phase or multiphase power.

System 200 is coupled to a utility grid 201 and is structured to transmit power between system 200 and utility grid 201. System 200 includes a distribution network 203, a plurality of loads L1-L8 coupled to network 203, and a plurality of DERs coupled to network 203. The plurality of DERs includes diesel generator 209, PV array 211, wind turbine 219, energy storage device 231, and PV array 233. A plurality of DER controllers is in communication with either a DER or a power converter structured to control power output from a corresponding DER. Each DER controller is configured to communicate with one of DER interface controllers 243, 245, and 247.

Diesel generator 209 is coupled to network 203 by way of a transformer. Generator 209 is in communication with DER controller 207. DER controller 207 is in communication with DER interface controller 243.

PV array 211 is coupled to a power converter 213 structured to receive DC power from PV array 211, convert the DC power to AC power, and output the AC power to network 203. Power converter 213 is in communication with DER controller 215. Controller 215 is configured to operate power converter 213 in order to control the power output from power converter 213 to network 203. DER controller 215 is in communication with DER interface controller 245.

Wind turbine 219 is coupled to network 203 by way of a transformer. Wind turbine 219 is in communication with DER controller 221. DER controller 221 is in communication with DER interface controller 245.

Energy storage system 231 is coupled to a power converter 229 structured to receive DC power from energy storage system 231, convert the DC power to AC power, and output the AC power to network 203. Power converter 229 is in communication with DER controller 227. Controller 227 is configured to operate power converter 229 in order to control the power output from power converter 229 to network 203. DER controller 227 is in communication with DER interface controller 247.

PV array 233 is coupled to a power converter 235 structured to receive DC power from PV array 233, convert the DC power to AC power, and output the AC power to network 203. Power converter 235 is in communication with DER controller 237. Controller 237 is configured to operate power converter 235 in order to control the power output from power converter 235 to network 203. DER controller 237 is in communication with DER interface controller 247.

Control system 202 includes the plurality of DER controllers, the plurality of DER interface controllers, and a plurality of central controllers. The plurality of DER controllers includes DER controllers 207, 215, 221, and 227. The plurality of DER interface controllers includes DER interface controllers 243, 245, and 247. The plurality of central controllers includes central controllers 251 and 249.

When DER controllers become able to communicate through standard based communication protocols using the DER interface controller, a system operator no longer needs to separately configure a communication channel between the DER controller and central controller. By comparison, a power distribution system may use a legacy protocol, such as Modbus or DNP3, to allow communication between two devices. The registers for analog measurements and control status differ for devices produced by different product groups require separate configuration in order for each DER controller to communicate with another device, such as DER interface controller 243. Such a communication configuration requires direct customer input to register and de-register DER controllers with a DER registry.

Each DER controller of control system 202 is coupled with a DER interface controller. Without the DER interface controller, significant effort is required to register a DER with a system operator. Customers must manually submit an application to a system operator for DER registration. The system operator then reviews and approves the application before the DER can be centrally controlled or monitored by the system operator. A similar process must be completed to de-register a DER for the purposes of transferring DER ownership or performing scheduled maintenance. The process becomes more arduous for DER controllers without standardized communication capabilities, such as Modbus communication protocol. In order to connect the new DER to existing DERMs or DMS, operators would need to configure the Modbus communication protocol, including configuring an analog and digital points list and associating the measured or controlled quantities with the specific point in the list.

With DER interface controllers that support plug and play functions, DERs can automatically register with existing central controllers after setting up the internal mapping of the DER interface controller. Each DER may be added to a semantically based model without the need for separate configuration for each DER. A semantic based model includes a plurality of objects in a model hierarchy, each object being specifically defined in the standard. Additionally, client-server model is supported by the standard based communication protocol, where data is reported whenever a changes occurs in a monitored quantity, eliminating the need to polling.

In the illustrated embodiment, central controller 249 is a distribution system operator or distribution network operator. Central controller 249 is structured to use the standard based plug-and-play functionality, automatically detecting and monitoring DER controllers by communicating with the DER interface controllers. Central controller 249 is also structured to monitor, analyze, and control the DERs of system 200 using the DER interface controllers. In certain embodiments, central controller 249 transmits commands to DER controllers through DER interface controllers so as to program schedules for DER production over a time horizon.

In the illustrated embodiment, central controller 251 is an independent system operator or a transmission system operator structured to manage the wholesale energy market by providing a bidding and market clearing platform, including determining the locational marginal price for participating DERs. Central controller 251 is structured to communicate with the DERs of system 200 using DER interface controllers 243, 245, and 247. In certain embodiments, the registration and de-registration process described herein with respect to central controller 249 is instead performed by central controller 251, including the storage and updating of the DER registry.

DER controllers, through a DER interface controller, may advertise to central controller 249 in an object model what capabilities their corresponding DER is able to provide in terms of power, energy, and ancillary services as well as operating conditions such as ramp rate and price. DER controllers may also use the standard based communication to request services, such as charging, based on grid state as published by system operator via CIM services. Using formal XML based description for DER asset capabilities provides a means for abstracting physical characteristics and specific details of a distribution system node, and expresses entity self-descriptions in a modeling language suitable for formal analysis and verification.

Implementing the DER interface controllers allows a system operator to have more control over system 200 while reducing registration/de-registration time. For example, updating a standard based communication protocol in a power distribution system with the DER interface controllers merely requires updating the communication stack of each DER interface controller. De-registering a DER for maintenance merely requires transferring a de-registration request from the DER interface controller to the central controller. In certain embodiments, the process of automatically registering or de-registering a DER from a central controller may be completed in less than 10 seconds, significantly faster than manual DER registration and de-registration.

In the illustrated embodiment, DER interface controller 243 is a local DERMS configured to transfer information between DER controller 207 and central controllers 249 and 251. As a local DERMS, controller 243 is in communication with only one DER controller.

In the illustrated embodiment, DER interface controller 245 is a local DERMS/aggregator configured to transfer information from DER controllers 215 and 221 to central controllers 249 and 251, and vice versa. The DERs associated with a local DERMS/aggregator may be owned by different customers or entities. For example, one DER may be owned by a homeowner while another DER is owned by a neighbor. DER aggregators may be owned by a utility company who own the DERs, or third party entities following market rules in a wholesale energy market. DER aggregators rely on communication between DERs and central controllers in order to provide grid services. For a non-utility owned DERs, the aggregator enables DERs to sign up for aggregated service offerings and disconnect when the aggregation relationship ends.

In the illustrated embodiment, DER interface controller 247 is a facility/community aggregator configured to transfer information from DER controllers 227 and 237 to central controllers 249 and 251, and vice versa. DERs associated with a facility/community aggregator may be located at the same site and owned by the same customer or entity. For example, battery bank 231 and PV array 233 may be located at an industrial plant and owned by the owners of the industrial plant.

Figure 3:
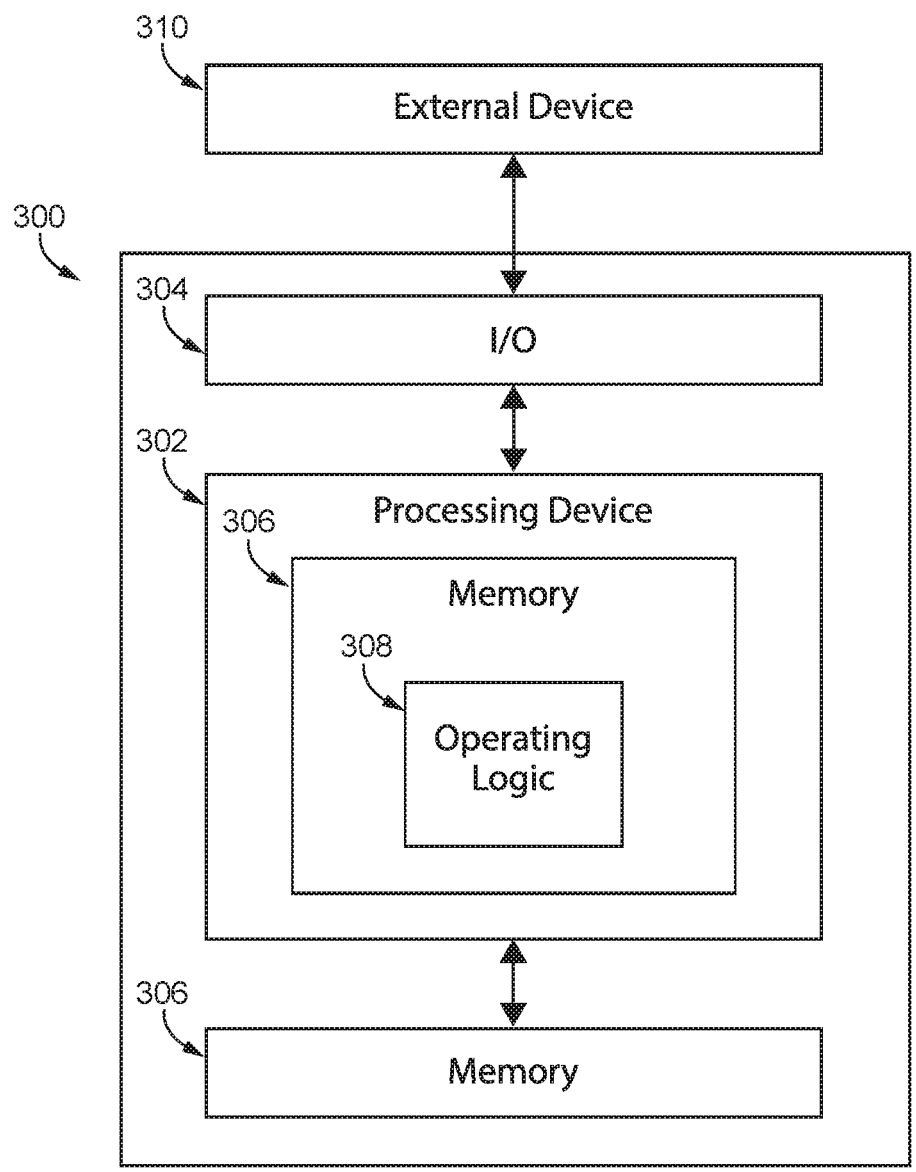
FIG. 3 is a schematic block diagram illustrating an exemplary power distribution controller.

With reference to FIG. 3, there is illustrated a schematic block diagram of an exemplary controller 300. For example, controller 300 may be one example of a DER controller, a DER interface controller, or a central controller used in connection with an exemplary power distribution system, such as system 200 shown in FIG. 2. Controller 300 includes a processing device 302, an input/output device 304, and a memory device 306. Controller 300 may be a stand-alone device, an embedded system, or a plurality of devices structured to perform the functions described with respect to one of the controllers of power system 200. Furthermore, controller 300 communicates with one or more external devices 310.

Input/output device 304 enables the controller 300 to communicate with external device 310. For example, input/output device 304 in different embodiments may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 304 is comprised of hardware, software, and/or firmware. Input/output device

304 may include more than one of these adapters, credentials, or ports, such as a first port for receiving data and a second port for transmitting data.

External device 310 may be any type of device that allows data to be input or output from controller 300. For example, external device 310 may be another controller of the power distribution system, a GPS, a DER, a relay, a sensor, a circuit breaker, or a user interface, to name but a few examples. External device 310 may be integrated into controller 300. It is further contemplated that more than one external devices is in communication with controller 300.

Processing device 302 may be a programmable type or a dedicated, hardwired state machine, to name but a few examples. Device 302 may include multiple processors, Arithmetic-Logic Units (ALUs), Central Processing Units (CPUs), Digital Signal Processors (DSPs), or Field-programmable Gate Arrays (FPGA), to name but a few examples. For forms of processing device 302 with multiple processing units, distributed, pipelined, or parallel processing may be used. Processing device 302 may be dedicated to performance of just the operations described herein or may be used in one or more additional applications. In the illustrated form, processing device 302 is of a programmable variety that executes processes and processes data in accordance with programming instructions (such as software or firmware) stored in memory device 306. Alternatively, or additionally, programming instructions are at least partially defined by hardwired circuitry or other hardware. Processing device 302 may be comprised of one or more components of any type suitable to process the signals received from input/output device 304 or elsewhere, and provide desired output signals. Such components may include digital circuitry, analog circuitry, or a combination thereof.

Memory device 306 may be of one or more types, such as a solid-state variety, electromagnetic variety, or optical variety, to name but a few examples. Furthermore, memory device 306 may be volatile, nonvolatile, transitory, non-transitory or a combination thereof, and some or all of memory device 306 may be of a portable variety, such as a disk, tape, memory stick, cartridge, to name but a few examples. In addition, memory device 306 may store data or operating logic that is manipulated by processing device 302, such as data representative of signals received from or sent to input/output device 304 in addition to or in lieu of storing programming instructions, to name just one example. As shown in FIG. 3, memory device 306 may be included with processing device 302 or coupled to processing device 302, but need not be included with both.

Further written description of a number of exemplary embodiments shall now be provided. One embodiment is a power distribution system comprising: a distributed energy resource (DER); a DER controller configured to operate the DER and store DER registration data; and a central controller configured to store a DER registry including information corresponding to a plurality of DERs; a DER interface controller including: a DER controller interface configured to communicate with the DER controller using a DER controller native format, an external device interface configured to communicate with the central controller using one of a plurality of communication protocols, each of the plurality of communication protocols being different than the DER controller native format, a registration circuitry coupled to the DER controller interface and external device interface, and configured to receive the DER registration data by way of the DER controller interface and transmit a registration request and the DER registration data to the central controller by way of the external device interface, and a mapping circuitry; wherein the central controller is configured to update the DER registry in response receiving the registration request, and wherein the mapping circuitry is configured to receive input defining power distribution system characteristics in response to the central controller updating the DER registry.

In certain forms of the foregoing power distribution system, the central controller removes the DER from the DER registry in response to the central controller receiving a de-registration request from the DER interface controller. In certain forms, the DER controller native format includes an industrial communication protocol and the plurality of communication protocols includes communication protocols defined by IEC 61850. In certain forms, the power distribution system comprises a plurality of DER interface controllers each configured to allow at least one of a plurality of DER controllers to communicate with the central controller, wherein the central controller is configured to transmit a set of coordinated commands to the DER controller and the plurality of DER controllers effective to operate registered DERs of the power distribution system. In certain forms, the central controller is configured to update a power system model in response receiving the registration request. In certain forms, the registration data contains a serial number. In certain forms, the input defining power distribution characteristics is generated by the central controller.

Another exemplary embodiment is a method of registering a distributed energy resource (DER) in a power distribution system comprising: operating a DER controller configured to operate the DER and store DER registration data; operating a central controller configured to store a DER registry including information corresponding to a plurality of DERs; receiving, with a DER interface controller, DER registration data from a DER controller in a DER controller native format; transmitting, with a DER interface controller, a registration request and the DER registration data to the central controller using one of a plurality of communication protocols, each of the plurality of communication protocols being different than the DER controller native format; updating the DER registry in response receiving the registration request; and receiving, with the DER interface controller, input defining power distribution system characteristics in response to the central controller updating the DER registry.

In certain forms of the foregoing method, the method comprises removing the DER from the DER registry in response to the central controller receiving a de-registration request from the DER interface controller. In certain forms, the DER controller native format includes an industrial communication protocol and the plurality of communication protocols includes communication protocols defined by IEC 61850. In certain forms, the power distribution system comprises a plurality of DER interface controllers each configured to allow at least one of a plurality of DER controllers to communicate with the central controller, and wherein the method comprises transmitting a set of coordinated commands to the DER controller and the plurality of DER controllers effective to operate registered DERs of the power distribution system. In certain forms, the central controller is configured to update a power system model in response receiving the registration request. In certain forms, the registration data contains a serial number. In certain forms, the input defining power distribution characteristics is transmitted by the central controller.

A further exemplary embodiment is a distributed energy resource (DER) interface controller comprising: a DER controller interface configured to communicate with a DER controller of a DER using a DER controller native format, an external device interface configured to communicate with the central controller using one of a plurality of communication protocols, each of the plurality of communication protocols being different than the DER controller native format, a registration circuitry coupled to the DER controller interface and external device interface, and configured to receive DER registration data from the DER controller by way of the DER controller interface and transmit a registration request and the DER registration data to the central controller by way of the external device interface, and a mapping circuitry; wherein transmitting the registration request is effective to cause the central controller is to update the DER registry in response receiving the registration request, and wherein the mapping circuitry is configured to receive input defining power distribution system characteristics from the central controller in response to the central controller updating the DER registry.

In certain forms of the foregoing DER interface controller, transmitting a de-registration request from the DER interface controller to the central controller is effective to remove the DER from the DER registry. In certain forms, the DER controller native format includes an industrial communication protocol and the plurality of communication protocols includes communication protocols defined by IEC 61850. In certain forms, the DER interface controller comprises a plurality of DER interface controllers each configured to allow at least one of a plurality of DER controllers to communicate with the central controller, wherein the central controller is configured to transmit a set of coordinated commands to the DER controller and the plurality of DER controllers effective to operate registered DERs of the power distribution system. In certain forms, the central controller is configured to update a power system model in response receiving the registration request. In certain forms, the registration data contains a serial number.

It is contemplated that the various aspects, features, processes, and operations from the various embodiments may be used in any of the other embodiments unless expressly stated to the contrary. Certain operations illustrated may be implemented by a computer including a processing device executing a computer program product on a non-transient, computer-readable storage medium, where the computer program product includes instructions causing the processing device to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A power distribution system comprising:
   a distributed energy resource (DER);
   a DER controller configured to operate the DER and store DER registration data; and
   a central controller configured to store a DER registry including information corresponding to a plurality of DERs;
   a DER interface controller including:
      a DER controller interface configured to communicate with the DER controller using a DER controller native format,
      an external device interface configured to communicate with the central controller using one of a plurality of communication protocols, each of the plurality of communication protocols being different than the DER controller native format,
      a registration circuitry coupled to the DER controller interface and external device interface, and configured to receive the DER registration data by way of the DER controller interface and transmit a registration request and the DER registration data to the central controller by way of the external device interface, and
      a mapping circuitry;
   wherein the central controller is configured to update the DER registry in response receiving the registration request, and
   wherein the mapping circuitry is configured to receive input defining power distribution system characteristics in response to the central controller updating the DER registry.

2. The power distribution system of claim 1 wherein the central controller removes the DER from the DER registry in response to the central controller receiving a de-registration request from the DER interface controller.

3. The power distribution system of claim 1 wherein the DER controller native format includes an industrial communication protocol and the plurality of communication protocols includes communication protocols defined by IEC 61850.

4. The power distribution system of claim 1 comprising a plurality of DER interface controllers each configured to allow at least one of a plurality of DER controllers to communicate with the central controller, wherein the central controller is configured to transmit a set of coordinated commands to the DER controller and the plurality of DER controllers effective to operate registered DERs of the power distribution system.

5. The power distribution system of claim 1 wherein the central controller is configured to update a power system model in response receiving the registration request.

6. The power distribution system of claim 1 wherein the registration data contains a serial number.

7. The power distribution system of claim 1 wherein the input defining power distribution characteristics is generated by the central controller.

8. A method of registering a distributed energy resource (DER) in a power distribution system comprising:
operating a DER controller configured to operate the DER and store DER registration data;
operating a central controller configured to store a DER registry including information corresponding to a plurality of DERs;
receiving, with a DER interface controller, DER registration data from a DER controller in a DER controller native format;
transmitting, with a DER interface controller, a registration request and the DER registration data to the central controller using one of a plurality of communication protocols, each of the plurality of communication protocols being different than the DER controller native format;
updating the DER registry in response receiving the registration request; and
receiving, with the DER interface controller, input defining power distribution system characteristics in response to the central controller updating the DER registry.

9. The method of claim 8 comprising removing the DER from the DER registry in response to the central controller receiving a de-registration request from the DER interface controller.

10. The method of claim 8 wherein the DER controller native format includes an industrial communication protocol and the plurality of communication protocols includes communication protocols defined by IEC 61850.

11. The method of claim 8 wherein the power distribution system comprises a plurality of DER interface controllers each configured to allow at least one of a plurality of DER controllers to communicate with the central controller, and wherein the method comprises transmitting a set of coordinated commands to the DER controller and the plurality of DER controllers effective to operate registered DERs of the power distribution system.

12. The method of claim 8 wherein the central controller is configured to update a power system model in response receiving the registration request.

13. The method of claim 8 wherein the registration data contains a serial number.

14. The method of claim 8 wherein the input defining power distribution characteristics is transmitted by the central controller.

15. A distributed energy resource (DER) interface controller comprising:

a DER controller interface configured to communicate with a DER controller of a DER using a DER controller native format,
an external device interface configured to communicate with the central controller using one of a plurality of communication protocols, each of the plurality of communication protocols being different than the DER controller native format,
a registration circuitry coupled to the DER controller interface and external device interface, and configured to receive DER registration data from the DER controller by way of the DER controller interface and transmit a registration request and the DER registration data to the central controller by way of the external device interface, and
a mapping circuitry;
wherein transmitting the registration request is effective to cause the central controller is to update the DER registry in response receiving the registration request, and
wherein the mapping circuitry is configured to receive input defining power distribution system characteristics from the central controller in response to the central controller updating the DER registry.

16. The DER interface controller of claim 15 wherein transmitting a de-registration request from the DER interface controller to the central controller is effective to remove the DER from the DER registry.

17. The DER interface controller of claim 15 wherein the DER controller native format includes an industrial communication protocol and the plurality of communication protocols includes communication protocols defined by IEC 61850.

18. The DER interface controller of claim 15 comprising a plurality of DER interface controllers each configured to allow at least one of a plurality of DER controllers to communicate with the central controller, wherein the central controller is configured to transmit a set of coordinated commands to the DER controller and the plurality of DER controllers effective to operate registered DERs of the power distribution system.

19. The DER interface controller of claim 15 wherein the central controller is configured to update a power system model in response receiving the registration request.

20. The DER interface controller of claim 15 wherein the registration data contains a serial number.

* * * * *